United States Patent [19]
Broadway et al.

[11] 3,826,960
[45] July 30, 1974

[54] ELECTRIC MOTORS

[75] Inventors: Alexander Richard William Broadway; William Fong, both of Westbury-on-Trym; Gordon Hindle Rawcliffe, Bristol, all of England

[73] Assignee: National Research Development Corporation, London, England

[22] Filed: Feb. 22, 1972

[21] Appl. No.: 228,137

[30] Foreign Application Priority Data
Mar. 26, 1971   Great Britain.................... 7920/71

[52] U.S. Cl............... 318/223, 318/224, 318/225 R
[51] Int. Cl............................................ H02k 17/10
[58] Field of Search............ 318/223, 224 R, 224 A, 318/225 R

[56] References Cited
UNITED STATES PATENTS
2,388,884   11/1945   Thompson.......................... 318/223
2,570,894   10/1951   Willsey........................... 318/223 X
2,946,941   7/1960    Jin................................ 318/223
3,024,821   7/1962    Stoll............................. 318/223 X Primary Examiner—Gene Z. Rubinson
Attorney, Agent, or Firm—Larson, Taylor & Hinds

[57] ABSTRACT

A single-phase alternating current, two-speed, shaded-pole induction motor having a squirrel cage rotor and having a stator winding switched to provide alternative pole-numbers by pole-amplitude modulation. The stator winding has a number of coils corresponding to the lower pole-number. The coil pitch and coil spacing represent a compromise between the lower and higher pole-numbers. The stator may be either of the salient pole or slotted type.

6 Claims, 3 Drawing Figures

SERIES - HIGHER POLE NUMBER
PARALLEL - LOWER POLE NUMBER

ELECTRIC MOTORS

This invention relates to electric motors and particularly to shaded-pole induction motors operating from a single-phase alternating current supply.

It is known to provide a two-speed, three-phase induction motor by switched stator-winding connections which give pole-amplitude modulation of the winding at one speed.

It is further known to provide a two-speed single-phase induction motor using a squirrel cage rotor and a stator winding switched for pole-amplitude modulation at one speed.

The object of the present invention is to provide a two-speed, single-phase shaded-pole induction motor having a squirrel cage rotor.

Accordingly, the invention provides a two-speed, single-phase alternating current shaded-pole induction motor having a stator winding switched to provide pole-amplitude modulation thereof to provide higher and lower pole numbers, the coils of the stator winding being in number corresponding to the lower pole-number and having a coil pitch and being spaced apart by angles which lie between the limiting angles representing the lower pole-number and higher pole-number coil pitch and pole spacing angles respectively.

Conveniently, such a motor has a stator of the salient-pole type having a number of salient poles corresponding to the higher pole-number arranged in spaced-apart groups, the spacing between groups being not greater than the spacing required by additional poles corresponding to the higher pole-numbers.

The known shaded-pole induction motor has a squirrel-cage rotor of the normal kind, but its stator is in general form similar to the stator of a D.C. machine with salient poles, except that the shaded-pole stator is built up of laminations, and not made from solid steel. The special peculiarity of the stator of a shaded-pole motor is that a solid copper ring embraces a portion of the tip of each of the poles, up to a third of the pole being thus enclosed. Corresponding tips on each pole carry shading coils.

The action of such shading rings is to divide the flux in each of the poles to which they are attached, into two components which are not cophasal. In the ideal case, the phases of the two components would be in quadrature. This ideal is not attainable in practice but any difference of phase between the fluxes in the two parts of each pole is sufficient to generate a rotating field, even if not of great strength.

Shaded-pole motors are normally used for 2-pole, 4-pole and 6-pole machines, though the principle is perfectly general. The 4-pole machine is probably the most important commercially.

In order that the invention may be readily carried into practice, one embodiment will now be described in detail, by way of example, with reference to the accompanying drawings, of which:

FIG. 1A shows the M.M.F. waveform diagram of a 4-pole stator winding with alternate N and S poles each extending $\pi/2 - \alpha/2$ radians of the stator.

FIG. 1B shows a single cycle pole-amplitude wave having a positive half-cycle from 0 to $\pi$ radians and a negative half-cycle from $\pi$ to $2\pi$ radians, corresponding to reversal of all the second half of the stator winding.

FIG. 1C shows the resultant pole distribution N-S-S-N around the stator.

Figure 1:
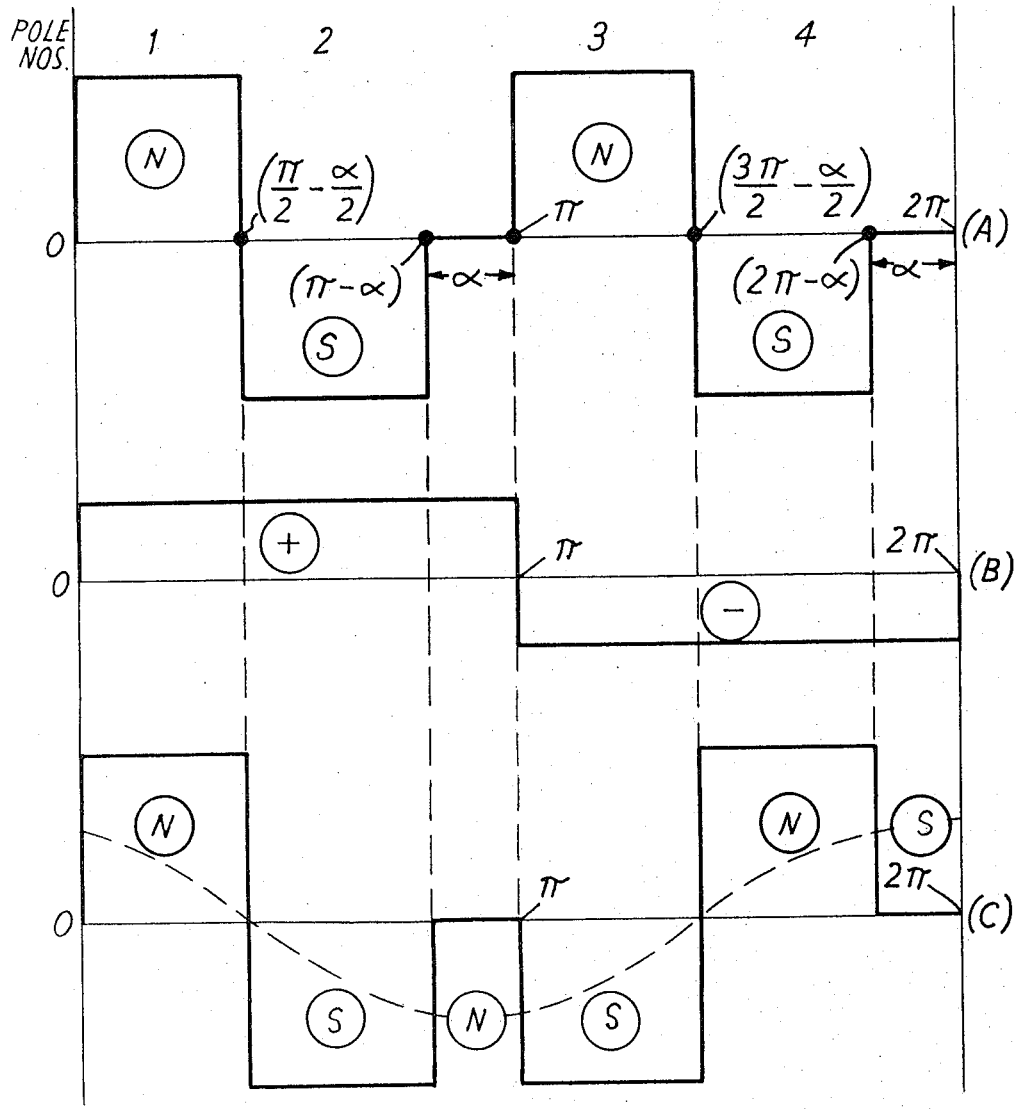
FIG. 1A is a M.M.F. waveform diagram of a 4-pole stator winding.
FIG. 1B shows a single cycle pole-amplitude modulation wave.
FIG. 1C shows the resultant M.M.F. waveform.

The resultant distribution has the appearance of a 6-pole waveform superimposed on a 2-pole wave, and it is known from pole-amplitude modulation theory that the product of applying the modulation wave of FIG. 1B to the pole distribution of FIG. 1A is $(4\pm2)$ poles, that is 2-pole and 6-poles.

Though two pole-numbers are produced by this reversal, such a machine will run at 6-pole speed, even when $\alpha = o$, because the 2-pole component goes so far into the subharmonic region that it has no effect and can be ignored. This may be tested by experiment, although the 6-pole torque is then rather low, and the slip is considerable.

To improve the 6-pole performance, it is necessary to use a special asymmetrical punching with spaces between pole 2 and pole 3, and between pole 4 and pole 1.

Figure 2:
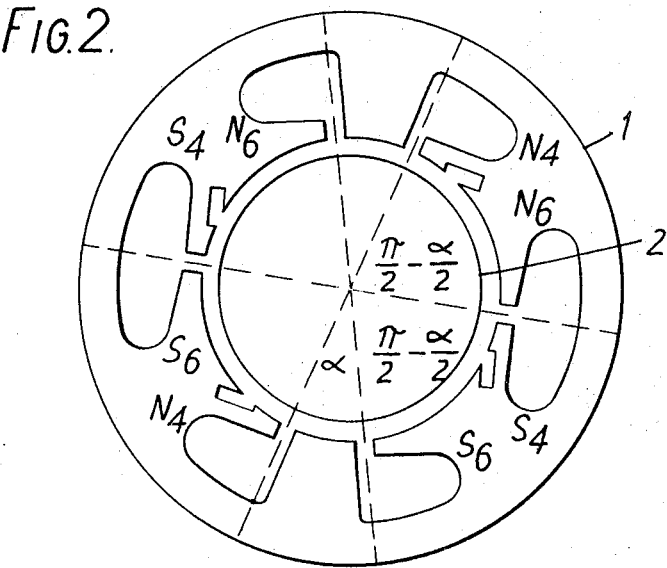
FIG. 2 shows in cross-section the stator and rotor of a 4-pole/6-pole, shaded-pole motor.

In FIG. 2 there is shown in cross-section a stator punching 1 of the salient pole type with its rotor 2. The angular spacing (mechanical) is shown by the angle $\alpha$. The four pole faces each subtend an angle $(\pi/2 - \alpha/2)$ at the rotor axis.

The polarity of each pole is indicated the suffix number indicating the working pole-number.

If the angular space $\alpha$ is zero, the punching is a normal 4-pole punching. If the angular space is $(\pi/3)$, the punching is effectively a 6-pole punching. Coils need be placed on only four of the poles, whatever the spacing.

If the optimum performance is desired for 4-pole operation and the 6-pole performance can be ignored, the angle $\alpha$ can be made small, or zero. In practice, it is worth sacrificing a little in the 4-pole performance, in order to procure a disproportionate improvement in the 6-pole performance.

The preferred value of the angle $\alpha$, for the desired 4-pole/6-pole characteristics, will be determined empirically. For example, for fan load applications, the optimum performance is required for 4-pole operation and the angle $\alpha$ preferred is unlikely to exceed 25°.

Figure 3:
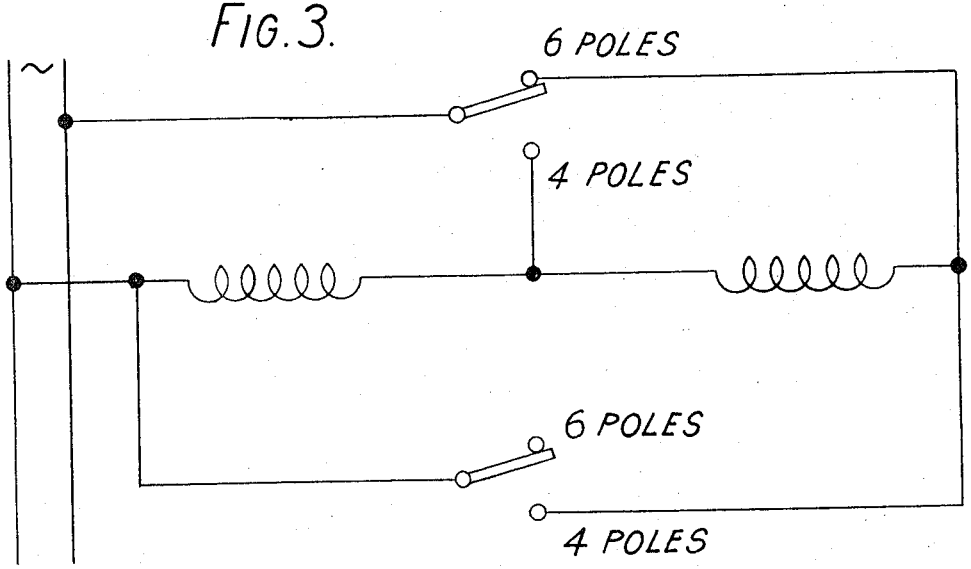
FIG. 3 is a circuit diagram showing suitable switching for the stator winding to provide alternative pole-numbers.

FIG. 3 is a circuit diagram of the 4-pole/6-pole stator winding showing the connection of the coils for 4-pole running and the simple reversal of one-half the winding to provide 6-pole working.

It should be noted that any of the familiar techniques used with single-speed shaded-pole motors can equally well be used with two-speed pole-amplitude modulation shaded-pole motors. The arrangements of the shading rings are similar. Reversal of such motors requires two sets of shading rings, which can be alternately open-circuited and short-circuited, to change the direction of rotation.

The salient-pole type of construction, which is commonly used and is exemplified herein, is in no way essential for this type of motor. It is equally possible to use a normal type of slotted stator punching, and to wind coils in positions corresponding to the coil positions indicated in FIG. 2.

It will readily be understood that a stator for an 8-pole/12-pole motor could be provided by four groups of two poles and a space each subtending one-half the angle shown in FIG. 2.

We claim:

1. A two-speed, single-phase alternating current shaded-pole induction motor including stator winding coils provided with switch means for providing pole-amplitude modulation thereof to produce higher and lower pole-numbers in a ratio other than 2:1, the coils of the stator winding corresponding in number to the lower pole-number and having a coil pitch and being spaced apart by angles which lie between the limiting angles representing the lower pole-number and higher pole-number coil pitch and pole spacing angles, respectively.

2. A two-speed, shaded-pole induction motor as claimed in claim 1, having a stator of the salient-pole type having a number of poles corresponding to the lower pole number arranged in spaced-apart groups, the angular spacing between groups being not greater than the space required by an additional pole and the sum of the said additional pole spaces representing the difference between the said higher and lower pole-numbers.

3. A two-speed, shaded-pole induction motor as claimed in claim 2 having an even number of spaced-apart groups each comprising two poles.

4. A two-speed, shaded-pole induction motor as claimed in claim 3, providing 4-poles and 6-poles alternatively, having two groups each of two poles subtending ($\pi/2 - \alpha/2$) radians spaced apart by an angle $\alpha$, where the angle $\alpha$ is greater than zero and less than $\pi/3$.

5. A two-speed, single-phase alternating current, shaded-pole induction motor including stator winding coils provided with switch means for providing higher and lower pole numbers in a ratio other than 2:1, the said stator winding coils corresponding in number to the lower pole-number and having a coil pitch and being spaced apart by angles which lie between the limiting angles represented by the lower pole-number and the higher pole-number coil pitch and pole-spacing angles, respectively.

6. A two-speed, shaded-pole induction motor as claimed in claim 1, having a stator of the slotted stator type having a number of poles corresponding to the lower pole number arranged in spaced-apart groups, the angular spacing between groups being not greater than the space required by an additional pole and the sum of the said additional pole spaces representing the difference between the said higher and lower pole-numbers.

* * * * *